US012165014B2

(12) United States Patent
Choi et al.

(10) Patent No.: US 12,165,014 B2
(45) Date of Patent: Dec. 10, 2024

(54) DYNAMIC ONTOLOGY CLASSIFICATION SYSTEM

(71) Applicant: S&P Global Inc., New York, NY (US)

(72) Inventors: Hyunyoung Choi, Boston, MA (US); Yuanli Pei, Boston, MA (US); Hanchul Choi, West New York, NJ (US); Bo Liu, West New York, NJ (US)

(73) Assignee: S&P Global Inc., New York, NY (US)

( * ) Notice: Subject to any disclaimer, the term of this patent is extended or adjusted under 35 U.S.C. 154(b) by 1134 days.

(21) Appl. No.: 17/011,151

(22) Filed: Sep. 3, 2020

(65) Prior Publication Data

US 2022/0067579 A1 Mar. 3, 2022

(51) Int. Cl.
*G06N 20/00* (2019.01)
*G06N 5/02* (2023.01)

(52) U.S. Cl.
CPC ............... *G06N 20/00* (2019.01); *G06N 5/02* (2013.01)

(58) Field of Classification Search
CPC .................................. G06N 20/00; G06N 5/02
See application file for complete search history.

(56) References Cited

U.S. PATENT DOCUMENTS

| 2020/0143241 | A1* | 5/2020 | Gao | G06F 18/217 |
|---|---|---|---|---|
| 2020/0143257 | A1* | 5/2020 | Neelamana | G06F 16/248 |
| 2020/0388396 | A1* | 12/2020 | Lindvall | G16H 50/20 |
| 2022/0027561 | A1* | 1/2022 | Ganesan | G06N 3/045 |

OTHER PUBLICATIONS

He, Junjie, and Kan Chen. "Exploring machine learning techniques for text-based industry classification." (2020). (Year: 2020).*
Wood et al, "Automated Industry Classification With Deep Learning", 12th IEEE International Conference on Semantic Computing, 2018, pp. 64-70.

* cited by examiner

*Primary Examiner* — Kevin W Figueroa
(74) *Attorney, Agent, or Firm* — Yee & Associates, P.C.

(57) ABSTRACT

A method, apparatus, system, and computer program product for method for dynamically managing an ontology for classifying data is provided. The ontology is generated from the classifications of a plurality of entities. Models are generated that predict classifications according to the ontology and natural language descriptions of the entities. Unclassified entities are modelled by according to the models to identify at least one classification within the ontology. Responsive to identifying a plurality of probable classifications within the ontology, a new classification is generated based on the plurality of probable classifications, an updated ontology is generated that includes the new classification, and the unclassified entity is classified according to the new classification.

24 Claims, 7 Drawing Sheets

DYNAMIC ONTOLOGY CLASSIFICATION SYSTEM

BACKGROUND INFORMATION

1. Field

The present disclosure relates generally to an improved system and method, which can be embodied in an apparatus, computer system, or computer program product, for training an artificial intelligence model to dynamically managing an ontology for classifying entities.

2. Background

The North American Industry Classification System (NAICS) is the standard used by Federal statistical agencies in classifying business establishments for the purpose of collecting, analyzing, and publishing statistical data related to the U.S. business economy.

NAICS was developed under the auspices of the Office of Management and Budget (OMB), and adopted in 1997 to replace the Standard Industrial Classification (SIC) system. It was developed jointly by the U.S. Economic Classification Policy Committee (ECPC), Statistics Canada, and Mexico's Instituto Nacional de Estadistica y Geografia, to allow for a high level of comparability in business statistics among the North American countries.

The Global Industry Classification Standard (GICS) is an industry taxonomy developed in 1999 by MSCI and Standard & Poor's (S&P) for use by the global financial community, and is used as a basis for S&P and MSCI financial market indexes. The GICS structure assigns each company sector, by its principal business activity. The system is similar to ICB (Industry Classification Benchmark), a classification structure maintained by FTSE Group.

However, Current industry classification systems like NAICS and GICS are static systems that cannot evolve through time. Some of the industries in these systems have become obsolete since the inception of the classification system. Many new industries have also emerged and cannot be properly reflected in those systems. These systems' classifications are "black and white"—when they classify a certain company as either belong to, or not belong to, a certain industry, there is no in-between, no probability, no confidence. In reality, the question of a company belonging to an industry in many cases is "to what degree" instead of "whether". Furthermore, the classifications of these systems are available for (major) public companies only. They are not applicable to private companies.

Other classification methodologies employ a large number of analysts and manually go through each company's documents in order to produce highly detailed and carefully curated reports including industry classification. The major inadequacy of such approach is the lack of scalability: it is difficult to quickly produce results for thousands of companies as our automated systems can. Another one is the subjectivity. As the reports are produced by different analysts, it's hard to guarantee the standards and quality.

Therefore, it would be desirable to have a method and apparatus that take into account at least some of the issues discussed above, as well as other possible issues. For example, it would be desirable to have a method and apparatus that overcome a technical problem with the large amount of resources used in dynamically managing an ontology for an entity classification system.

SUMMARY

An embodiment of the present disclosure provides a data classification system comprising a computer system and an ontology manager in the computer system. The ontology manager is configured to generate an ontology from classifications of a plurality of entities. The ontology manager is configured to generate models that predict classifications according to the ontology and natural language descriptions of the entities. The ontology manager is configured to model an unclassified entity according to the models to identify at least one classification within the ontology. The ontology manager, responsive to identifying a plurality of probable classifications within the ontology, is configured to generate a new classification based on the plurality of probable classifications, to generate an updated ontology that includes the new classification, and to classify the unclassified entity according to the new classification.

Another embodiment of the present disclosure provides a computer-implemented method for dynamically managing an ontology for classifying data. The ontology is generated by a computer system from the classifications of a plurality of entities. Models are generated by the computer system that predict classifications according to the ontology and natural language descriptions of the entities. Unclassified entities are modeled by the computer system according to the models to identify at least one classification within the ontology. Responsive to identifying a plurality of probable classifications within the ontology, a new classification is generated based on the plurality of probable classifications, an updated ontology is generated that includes the new classification, and the unclassified entity is classified according to the new classification.

Still another embodiment of the present disclosure provides a computer program product for dynamically managing an ontology for classifying data. The computer program product comprises a computer-readable storage media and program code stored on the computer-readable storage media. The program code is executable by a computer system to cause the computer system to generate the ontology from classifications of a plurality of entities. The program code is executable by the computer system to cause the computer system to generate models that predict classifications according to the ontology and natural language descriptions of the entities. The program code is executable by the computer system to cause the computer system to model an unclassified entity according to the models to identify at least one classification within the ontology. The program code is executable by the computer system in response to identifying a plurality of probable classifications within the ontology, to cause the computer system to generate a new classification based on the plurality of probable classifications, to generate an updated ontology that includes the new classification, and to classify the unclassified entity according to the new classification.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current industry classification systems like NAICS and GICS are static systems that cannot evolve through time. Some of the industries in these systems have become obsolete since the inception of the classification system. Many new industries have also emerged and cannot be properly reflected in those systems. These systems' classifications are "black and white"—when they classify a certain company as either belong to, or not belong to, a certain industry, there is no in-between, no probability, no confidence. In reality, the question of a company belonging to an industry in many cases is "to what degree" instead of "whether". Furthermore, the classifications of these systems are available for (major) public companies only. They are not applicable to private companies.

The illustrative embodiments further recognize and take into account that training artificial intelligence models to reach desired levels of accuracy can take more time than desired. The illustrative embodiments recognize and take into account that currently, creating training datasets of documents to train an artificial intelligence model to categorize and entity is a labor-intensive manual process often requiring humans having to read hundreds or thousands of documents and label each document. The illustrative embodiments recognize and take into account that the manual process for creating a data set often results in a data set that is smaller than desired.

Further, the illustrative embodiments recognize and take into account the fact that the limited size of the training datasets can make it difficult for artificial intelligence models to be trained to a higher level of accuracy in recognizing concepts, because the use of a smaller dataset may provide lower accuracy levels. The illustrative embodiments recognize and take into account that, with the limited size of training datasets, a higher accuracy dynamically managing an ontology for classifying entities will not be reached.

The illustrative embodiments also recognize and take into account that it would be desirable to reduce or eliminate the need for human intervention in creating training datasets for training an artificial intelligence model to dynamically manage an ontology for classifying entities. Thus, the illustrative embodiments provide a method, apparatus, system, and computer program product for automatically training an artificial intelligence model to dynamically managing an ontology for classifying entities. With this automation, the amount of human labor needed to create the training datasets and manage the classification ontology can be reduced or eliminated using an illustrative example.

Figure 1:
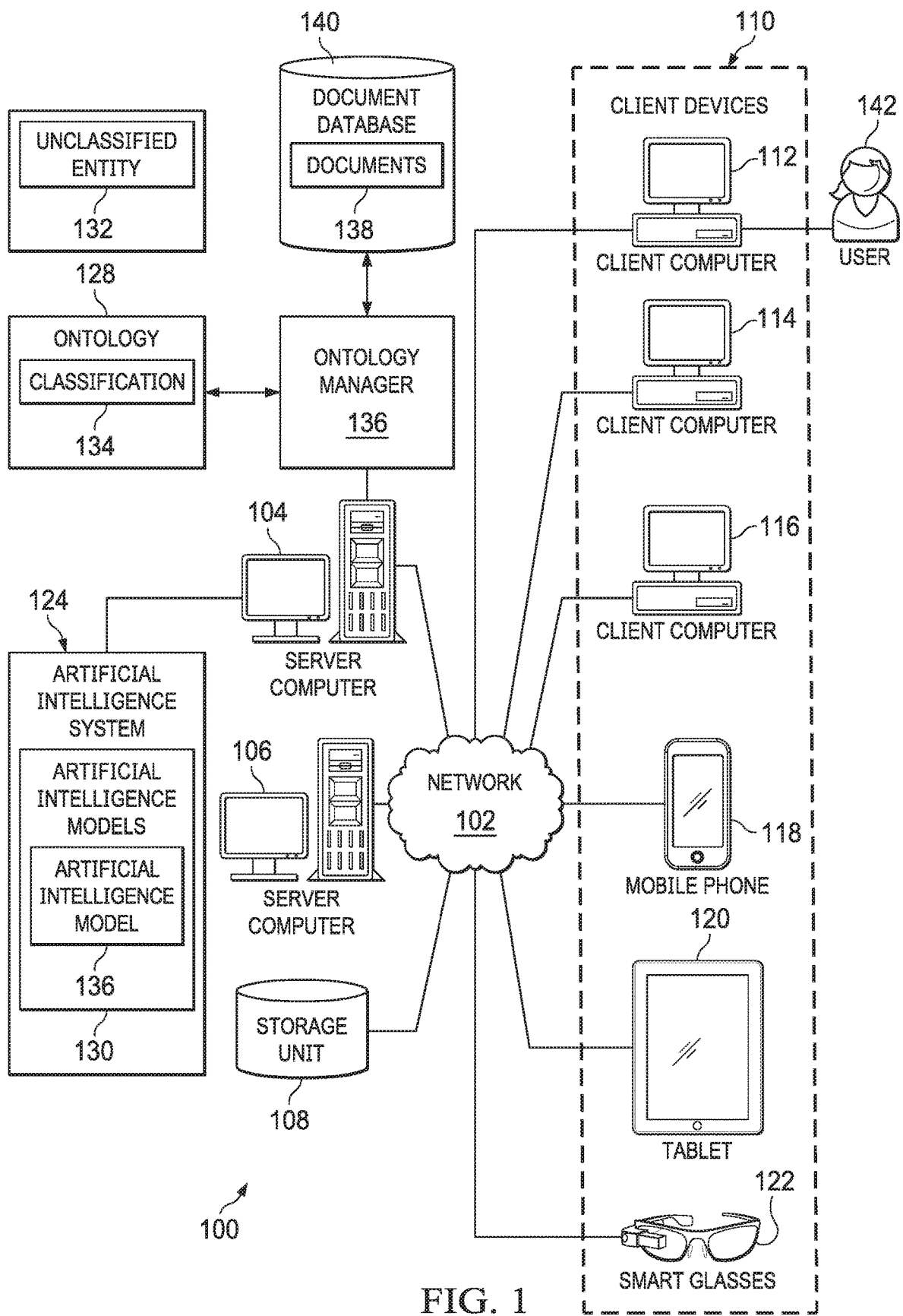
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, artificial intelligence system 124 running on server computer 104 operates to classify entities 126 according to ontology 128. In this illustrative example, artificial intelligence system 124 comprises artificial intelligence models 130 that have been trained to classify entities 126. As depicted, artificial intelligence system 124 can return a result to client computer 112 in response to receiving a request to classify an unclassified entity 132. The result contains one or more classifications 134 within the ontology 128 identified for unclassified entity 132.

In this illustrative example, ontology manager 136 is located in server computer 104. As depicted, ontology manager 136 operates to train artificial intelligence models 130 in artificial intelligence system 124 to classify entities 126 in one or more classifications 134 according to ontology 128.

In the illustrative example in this figure, the size of training documents in training datasets can be very large when created by ontology manager 136 as compared to those created using human labor. For example, a training data set can include tens of thousands, hundreds of thousands, or millions of documents 138 as compared to a few hundred documents selected using human labor.

Further, a time reduction is present in training artificial intelligence models 130 in the illustrative example. For example, the processing of documents to create training datasets with documents 138 from database 140 can be performed more quickly as compared to current techniques using human labor. For example, tagging documents for training datasets and training artificial intelligence models 130 can be performed in seconds or minutes in the illustrative example as compared to hours or days using human labor.

Figure 2:
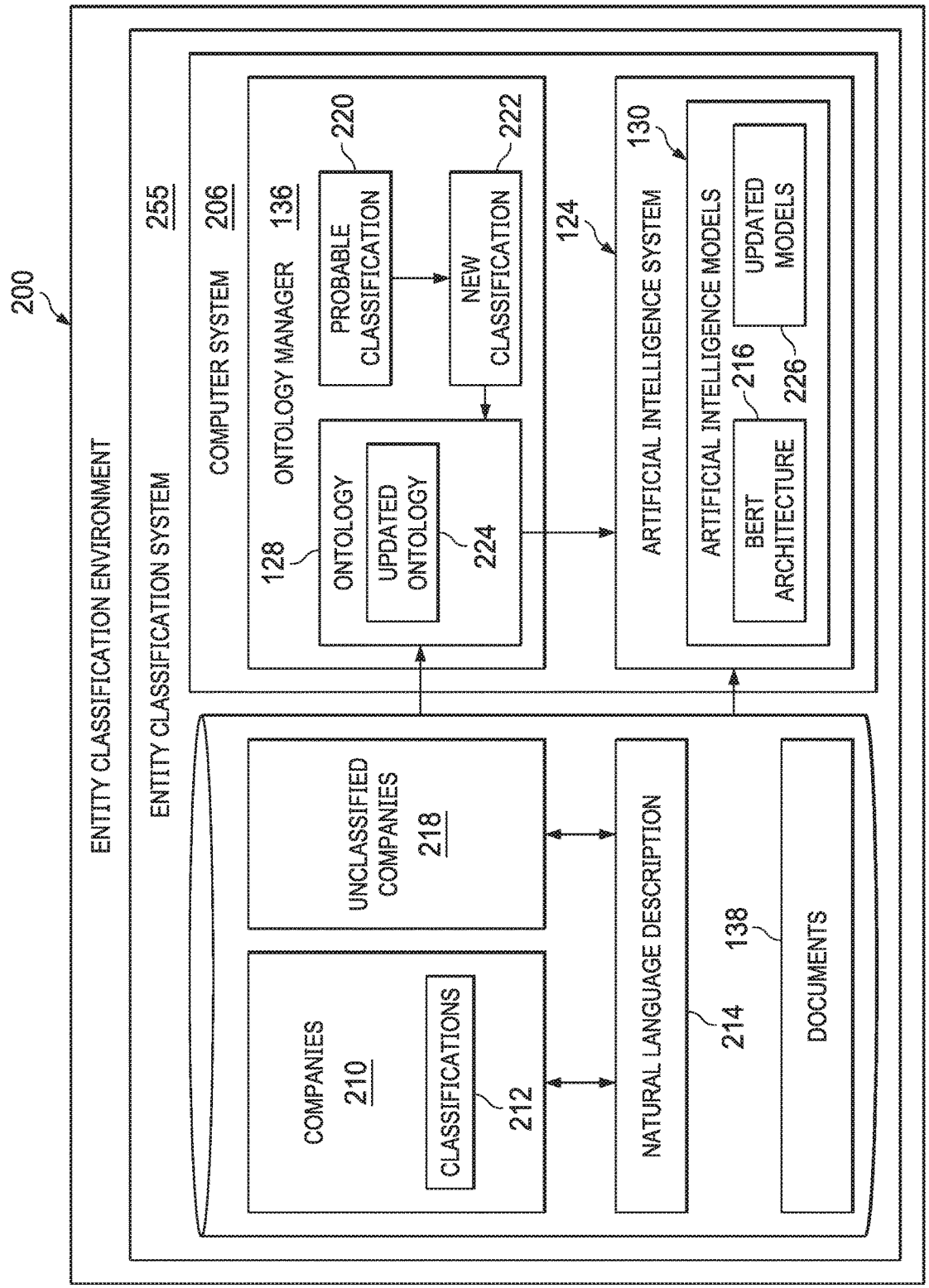
FIG. 2 is a block diagram of an entity classification environment in accordance with an illustrative embodiment.

With reference now to FIG. 2, a block diagram of an entity classification environment is depicted in accordance with an illustrative embodiment. In this illustrative example, entity classification environment 200 includes components that can be implemented in hardware such as the hardware shown in network data processing system 100 in FIG. 1.

As depicted, entity classification environment 200 is an environment in which ontology manager 136 manages artificial intelligence system 124 in computer system 206 to provide services for classifying public and private companies using modern natural language processing (NLP) technologies and company specific data.

Computer system 206 is a physical hardware system and includes one or more data processing systems. When more than one data processing system is present in computer system 206, those data processing systems are in communication with each other using a communications medium. The communications medium may be a network. The data processing systems may be selected from at least one of a computer, a server computer, a tablet, or some other suitable data processing system.

In this illustrative example, ontology manager 136 and computer system 206 form entity classification system 255. In managing artificial intelligence system 124 to provide services, ontology manager 136 can perform training of artificial intelligence models 130 for use in artificial intelligence system 124.

In this illustrative example, artificial intelligence models 130 can be trained by ontology manager 136 to classify companies 210. Artificial intelligence models 130 comprise at least one of an artificial neural network, a cognitive system, a Bayesian network, a fuzzy logic, an expert system, a natural language system, or some other suitable system. Machine learning is used to train artificial intelligence models 130. Machine learning involves inputting data to the process and allowing the process to adjust and improve the function of artificial intelligence models 130.

Ontology manager 136 can be implemented in software, hardware, firmware, or a combination thereof. When software is used, the operations performed by ontology manager 136 can be implemented in program code configured to run on hardware, such as a processor unit. When firmware is used, the operations performed by ontology manager 136 can be implemented in program code and data and stored in persistent memory to run on a processor unit. When hardware is employed, the hardware may include circuits that operate to perform the operations in ontology manager 136.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, Ontology manager 136 generates ontology 128 from classifications 212 of a plurality of companies 210. In this illustrative example, companies 210 are examples of entities 126 of FIG. 1.

As used herein, an "ontology" is a conceptualized specification of the meanings of the symbols in an information system. An ontology typically consists of a vocabulary of the categories of the things (both classes and properties) represented in a knowledge base, an organization of those categories, and a set of axioms restricting the meanings of some of the vocabulary to better reflect their meaning.

In one illustrative example, ontology manager 136 uses public companies with existing classifications such as North American Industry Classification System (NAICS), The Global Industry Classification Standard (GICS) to build the ontology. In one illustrative example, ontology manager constructs the NAICS/GICS system in a tree structure, and populates all the public companies in the database into this tree by mapping their NAICS/GICS codes.

Ontology manager 136 operates to train artificial intelligence models 130 in artificial intelligence system 124. ontology manager 136 trains artificial intelligence models 130 in artificial intelligence system 124 using ontology 128 and natural language descriptions 214 of companies 210. In this manner, ontology manager 136 generates artificial intelligence models 130 that predict classifications 212 of companies 210 according to the ontology 128 and natural language descriptions 214 of the companies 210.

As used herein, a "natural language" or "ordinary language" is a language that has evolved through natural human-use and repetition, such as speech or signing, without conscious planning or premeditation. Natural languages are distinguished from constructed and formal languages such as those used to program computers. Natural language descriptions 214 of companies 210 can be determined from documents 138 using one or more artificial intelligence models 130.

In this illustrative example, artificial intelligence models 130 comprise at least one of an artificial neural network, a cognitive system, a Bayesian network, a fuzzy logic, an expert system, a natural language system, or some other suitable system. Machine learning is used to train artificial intelligence models 130. Machine learning involves inputting data to the process and allowing the process to adjust and improve the function of artificial intelligence models 130.

Because natural language processing is a diversified field with many distinct tasks, most task-specific datasets contain only a few thousand or a few hundred thousand human-labelled training examples. In one illustrative example, ontology manager uses pretraining and transfer learning models to overcome the shortage of training data.

In one illustrative example, ontology manager 136 uses a Bidirectional Encoder Representations from Transformers (BERT) architecture 216 to train artificial intelligence models 130. The BERT framework uses pre-training and fine-tuning to create bidirectional representations from unlabeled text by jointly conditioning on both left and right context.

BERT architecture 216 uses bidirectionality by pre-training on a couple of tasks—Masked Language Model and Next Sentence Prediction. The masked language model randomly masks some of the tokens from the input, and the objective is to predict the original vocabulary id of the masked word based only on its context. a "next sentence prediction" model jointly pretrains text-pair representations by splitting the corpus into sentence pairs. For 50% of the pairs, the second sentence would actually be the next sentence to the first sentence, labeled 'IsNext'. For the remaining 50% of the pairs, the second sentence would be a random sentence from the corpus labeled 'NotNext'.

As used herein, a "sentence" can be an arbitrary span of contiguous text, rather than an actual linguistic sentence. A "sequence" refers to the input token sequence to BERT, which may be a single sentence or multiple sentences packed together.

By employing pretraining and transfer learning models, the number of documents 138 used by ontology manager 136 to train artificial intelligence models 130 can be very large when created as indicated in the illustrative example as compared to those created using human labor. For example, ontology manager 136 can train artificial intelligence models 130 using tens of thousands, hundreds of thousands, or millions of documents 138 as compared to a few hundred of documents 138 selected using human labor.

Training artificial intelligence models 130 in artificial intelligence system 124 using ontology 128 and natural language descriptions 214 of the companies 210 enables ontology manager 136 to generate artificial intelligence models 130 that predict classifications 212 of unclassified companies 218 according to the ontology 128 and natural language descriptions 214 of the unclassified companies 218. When one or more artificial intelligence models 130 is trained, artificial intelligence models 130 can be added to artificial intelligence system 124. Artificial intelligence models 130 in artificial intelligence system 124 are artificial intelligence models that have been trained to predict classifications 212 of unclassified companies 218. In some illustrative examples, artificial intelligence system 124 can also include hardware such as a computer system that includes one or more data processing systems.

Using the trained artificial intelligence models, ontology manager 136 predicts at least one of classifications 212 within the ontology 128 for an unclassified company 218. Ontology manager 136 predicts the classification of unclassified company 218 according to natural language descriptions 214 of the unclassified company 218. Output from the trained artificial intelligence models 130 for each unclassified company 218 is a probability distribution, indicating the likelihood that the unclassified company 218 belongs to a particular one of classifications 212.

If artificial intelligence models 130 are confident that the entity belongs to a certain classification, i.e. with a single high probability, this entity is considered as classified. In this illustrative example, responsive to identifying a single probable classification 220 within the ontology 128, ontology manager classifies the unclassified company 218 according to the single probable classification. In one illustrative example, Confidence can be expressed as an absolute probability of a particular classification, as a relative probability of a particular classification relative to other classifications in the ontology.

On the other hand, if artificial intelligence models 130 predict that unclassified company 218 is equally likely to belong to more than one probable classification 220, a new classification 222 may be needed within the ontology that to more accurately describes the unclassified entity. In this illustrative example, responsive to identifying more than one probable classification 220 within the ontology 128, the ontology manager 136 generates a new classification 222 based on identifying more than one probable classification 220. The ontology manager 136 generates an updated ontology 224 that includes the new classification 222. The ontology manager 136 classifies the unclassified company 218 in the new classification 222 according to the updated ontology 224. responsive to generating the updated ontology 224, ontology manager 136 trains artificial intelligence models 130 based on the updated ontology 224, generating updated models 226 predict classifications 212 according to the updated ontology 224 and the natural language descriptions 214 of the companies 210, including the previously unclassified company 218.

Further, in the illustrative example, ontology manager 136 can use semi-supervised machine learning to train artificial intelligence model 130 as compared to current techniques that use unsupervised machine learning. With the use of semi-supervised machine learning, increased accuracy and performance can be achieved when training artificial intelligence model 130. Although some human resources are used with semi-supervised machine learning to train artificial intelligence model 130, the amount of human resources employed is much less as compared to the human resources used to generate training with current supervised training techniques.

For example, if artificial intelligence models 130 predict a group of companies are equally likely to belong to two or three different classifications of industries, a new industry may be needed to more accurately described this group of companies. For instance, a field of "FinTech" (Financial Technology) companies may be considered by the models as somewhere between financial industry and technology industry, hence calling for a new industry class to reflect the booming field. Ontology manager 136 may suggest the new classification 222, however approval of the suggestion by a user, such as user 142 of FIG. 1, having knowledge of the industry may be required before updating the ontology.

In the illustrative example, artificial intelligence model 130 can be trained more quickly using documents 138 by ontology manager 202 employing pretraining and transfer learning models in a semi-supervised manner as compared to current techniques using human input. In the illustrative example, a time reduction is present in training artificial intelligence model 130. For example, the processing of documents 138 can be performed more quickly as compared to current techniques using extensive human labor to create a training set. For example, processing documents 138 for training data sets and training artificial intelligence models 130 can be performed in seconds or minutes in the illustrative example as compared to hours or days using human labor with current techniques.

Ontology manager 202 employing pretraining and transfer learning models can result in at least one of faster or more comprehensive training of artificial intelligence models 130. Artificial intelligence models 130 has increased accuracy in classifying companies 210 as compared to other artificial intelligence models with the same amount of training time using current techniques. Further, repeated training of artificial intelligence models 130 using additional training documents can be reduced or eliminated by ontology manager 202 using documents 138 to train artificial intelligence models 130 employing pretraining and transfer learning models, as compared to manual human classification.

Figure 3:
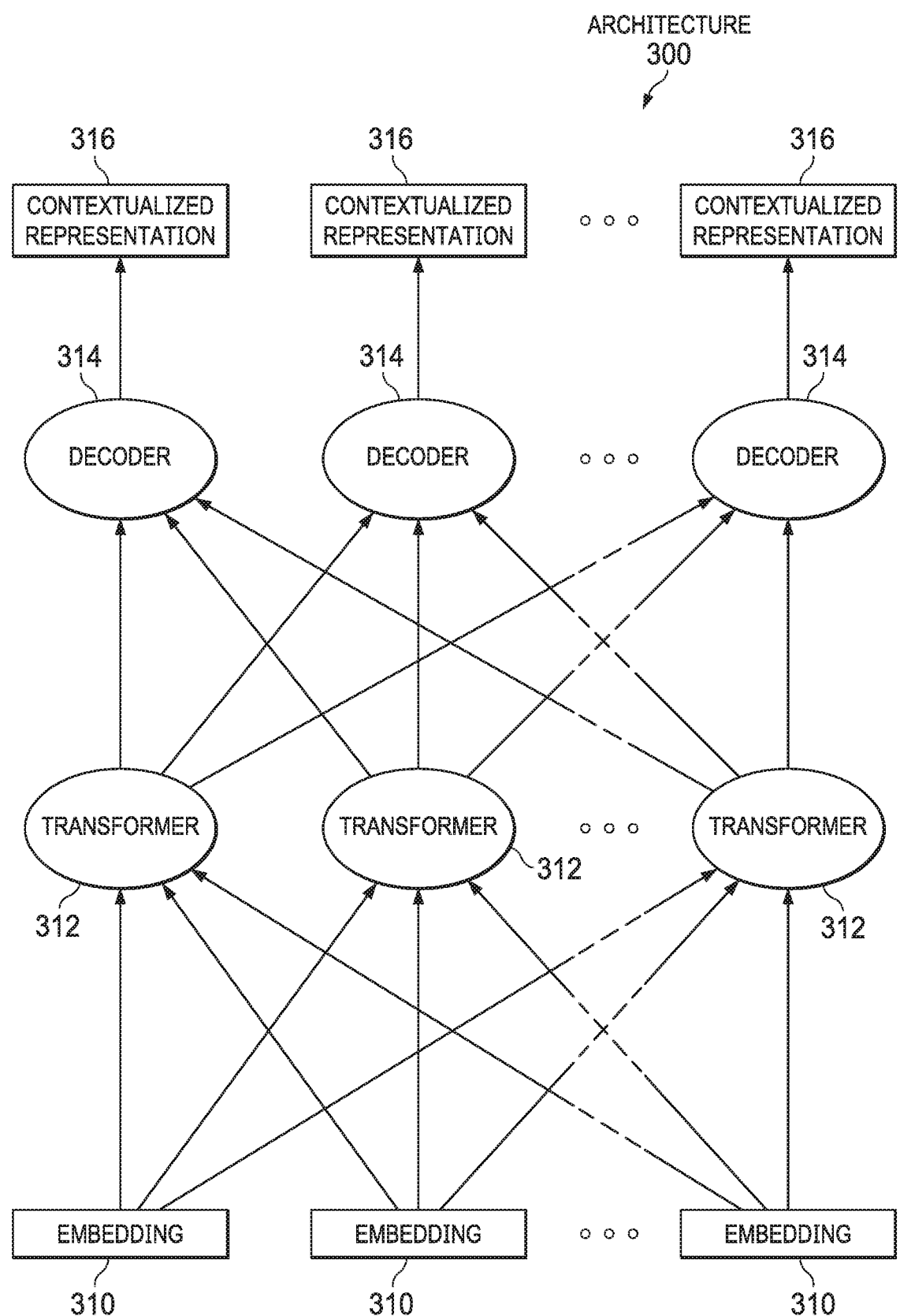
FIG. 3 is an architecture of an artificial intelligence model to classify an entity in accordance with an illustrative embodiment.

With reference next to FIG. 3, an architecture of an artificial intelligence model to classify an entity is depicted in accordance with an illustrative embodiment. Architecture 300 is an example of an architecture used to make one or more artificial intelligence models. In the illustrative examples, the same reference numeral may be used in more than one figure. This reuse of a reference numeral in different figures represents the same element in the different figures.

As depicted, architecture 300 is a Bidirectional Encoder Representations from Transformers (BERT) architecture, designed to pre-train deep bidirectional representations from unlabeled text by jointly conditioning on both left and right context. Architecture 300 uses a multi-layer bidirectional Transformer encoder architecture that performs self-attention in both directions.

Embeddings 310 are vector representation of words in the natural language descriptions found in documents. In the BERT architecture, each of embeddings 310 is a combination of three embeddings: positional embeddings to express the position of words in a sentence, segment embedding to distinguish between sentence pairs, and token embeddings learned for the specific token from the pretraining corpus token vocabulary.

Embeddings 310 of the input sequence are passed to all the transformers 312 in a first layer of the stack. The embeddings are then transformed and propagated to the all transformers in a next layer (not shown) of the stack. The output from the last encoder in the encoder-stack is passed to all the decoders 314 in the decoder-stack, which output the final contextualized representation 316 of each input word.

Architecture 300 effectively captures information from both the right and left context of a token from the first layer itself and all the way through to the last layer. Architecture 300 overcomes loss in information errors susceptible to traditional language models trained on a left-to-right or right-to-left context.

Figure 4:
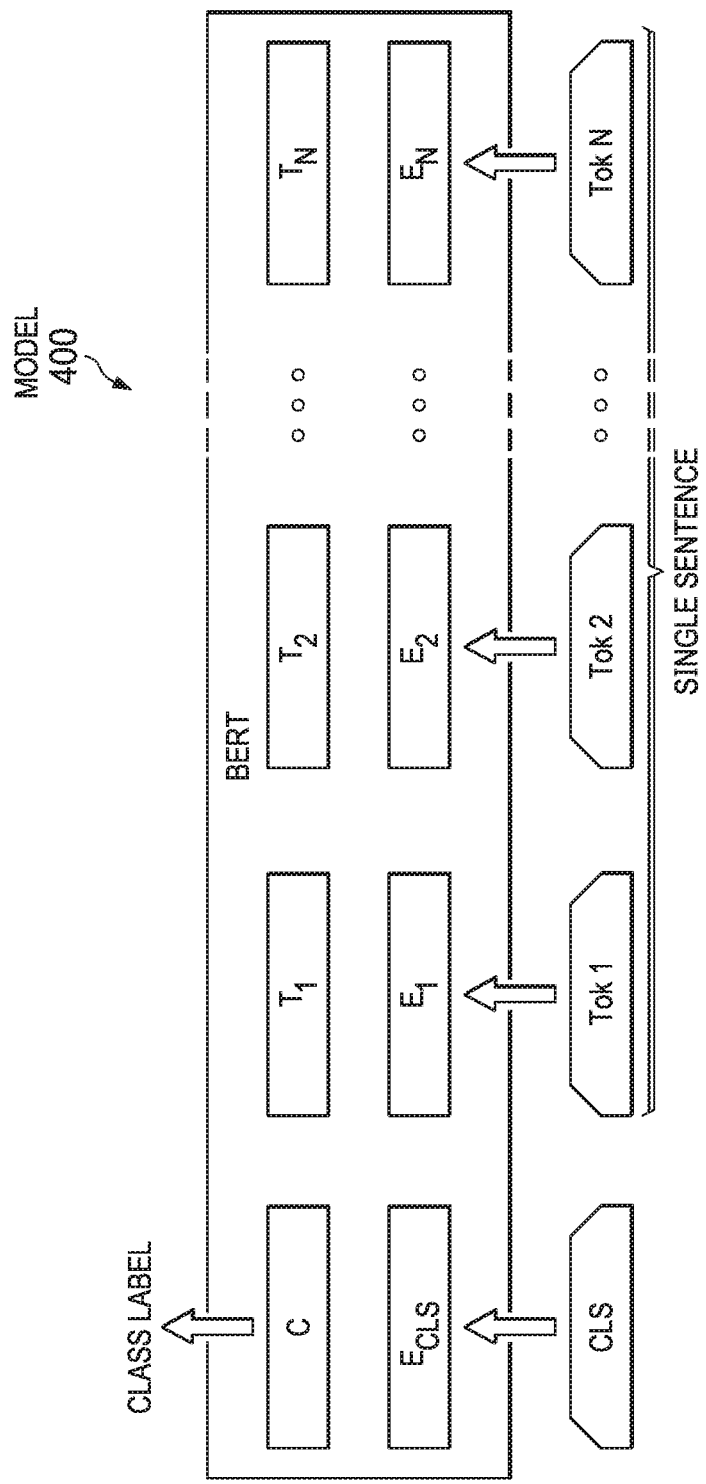
FIG. 4 is a task-specific classification model is depicted in accordance with an illustrative embodiment.

Turning now to FIG. 4, a task-specific classification model is depicted in accordance with an illustrative embodiment. Model 400 is one example of architecture 300 of FIG. 3.

Model 400 is a sequence-level task for classifying a single sentence. As depicted, E represents the input embedding, such as embeddings 310 of FIG. 3. Ti represents the contextual representation of token i, such as contextual representation 316 of FIG. 3. CLS is the special symbol for classification output.

Figure 5:
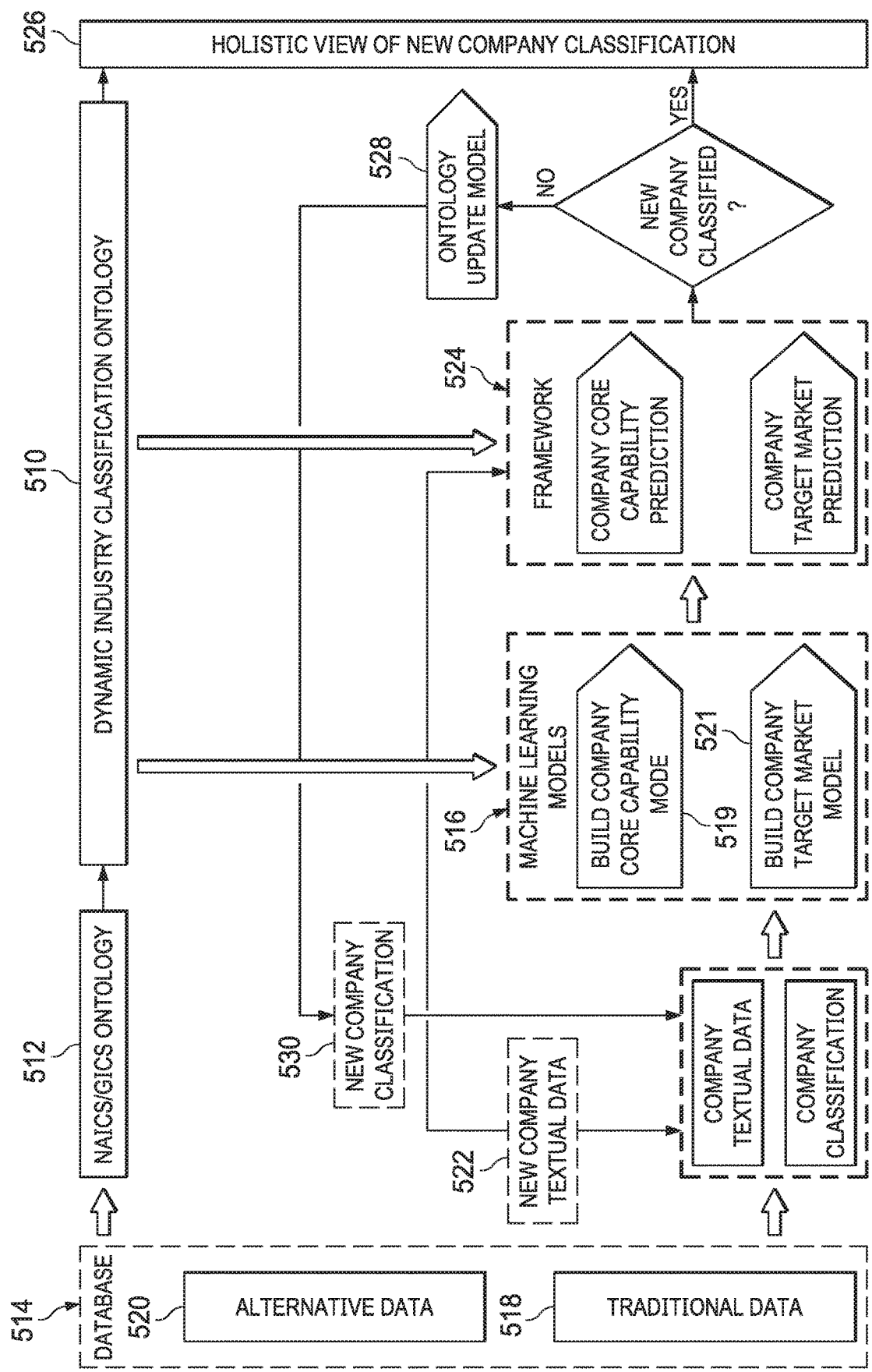
FIG. 5 is a data flow diagram illustrating a data flow used for classifying an entity in accordance with an illustrative embodiment.

Turning now to FIG. 5, a dataflow for classifying entity is depicted in accordance with an illustrative embodiment.

Dynamic industry classification ontology 510 is built Using public companies with existing classifications in ontology 512, such as a NAICS and GICS ontology, as the starting point. Specifically, the NAICS/GICS ontology system is reconstructed in a tree structure. Public companies in the database 514 are populated into this tree by mapping their NAICS/GICS codes.

Machine learning models 516 are built to predict companies' classifications using traditional data 518 and alternative data 520. Traditional data 518 can include, for example, company descriptions, filings, and standard industry classifications. Alternative data 520 can include, for example, news articles, press releases, technical papers, white papers, social media postings, wiki descriptions, and other suitable types of documents.

In this illustrative example, two different machine learning models 516 are built, each with a different emphasis. Model 519 is built to predict a company's core capability, i.e. what the company does. Model 521 is built to predict a company's target market, i.e. whom the company servers.

After the models are built, textual data 522 of any companies without existing classifications, such as private companies or new companies, can be fed into the framework 524. Since the only input to this automated system is textual data on the companies including company description, financial reports, news and so on, little domain expert is needed.

The output for each company will be a probability distribution, indicating the likelihood that this company belongs to each industry. If the models are confident the company belongs to a certain industry, i.e. with a single high probability, the company is classified according to the prediction, providing a holistic view 526 of company classification that is based on both company core business and a target market perspective.

On the other hand, if the models think a company is equally likely to belong to two or three industries, a new industry may be needed to more accurately described this group of companies. For instance, a Financial Technology (FinTech) field of companies may be considered by the models as somewhere between financial industry and technology industry, hence calling for a new industry class to reflect the field.

Once such new industries are identified, the ontology and models are updated 528 to reflect the additions of the new company classification 530. New machine learning models are then built with the updated ontology.

In one illustrative example, one or more technical solutions are present that overcome a technical problem with the large amount of resources used in training artificial intelligence models to classify an entity. As a result, one or more technical solutions can provide a technical effect of classifying public and private companies using modern natural language processing (NLP) technologies and company data using fewer human resources as compared to current techniques.

One or more technical solutions can reduce or eliminate the need for user involvement from a domain expert, since the only input to this automated system is textual data on the companies including company description, financial reports, and news articles.

Further, in the illustrative example, artificial intelligence models can output the percentages (probabilities) of a company's major industries, enabling changes in the industries and the company's focus over time to be more easily identified. When the model's output of all the companies is analyzed, emerging fields and technologies are identified, as well as company's competitors. For example, if a group of companies with similar output probability distribution that does not resemble any of the existing public companies, an emerging field (which is often associated with some emerging technologies) has likely been identified.

Computer system 206 can be configured to perform at least one of the steps, operations, or actions described in the different illustrative examples using software, hardware, firmware, or a combination thereof. As a result, computer system 206 operates as a special purpose computer system in which ontology manager 136 in computer system 206 enables training artificial intelligence models in an automated manner that can dynamically adapt the classification ontology to reflect changes in both industrial focus and characterize emerging industries.

In the illustrative example, the use of ontology manager 136 in computer system 206 integrates processes into a practical application for training artificial intelligence models 130 to categorize an entity that increases the performance of computer system 206. Further, the amount of human labor necessary to create training data sets and manage the classification ontology can be reduced.

Artificial intelligence models 130 trained using ontology manager 136 can result in artificial intelligence models 130 that are more accurate in categorizing an entity within an ontology 128 as compared to currently available artificial intelligence models. In the illustrative example, the accuracy can increase because the size of a number of documents 138 in the training data sets can be much larger as compared to current techniques' sets.

Further, the processes used by ontology manager 202 to can be used to train artificial intelligence models 130 that are more accurate as compared to other currently available techniques. In other words, ontology manager 136 in computer system 206 is directed to a practical application of processes integrated into ontology manager 136 in computer system 206 that classifies and entity within dynamically updated ontology.

The illustration of entity classification environment 200 in FIGS. 2-5 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 6:
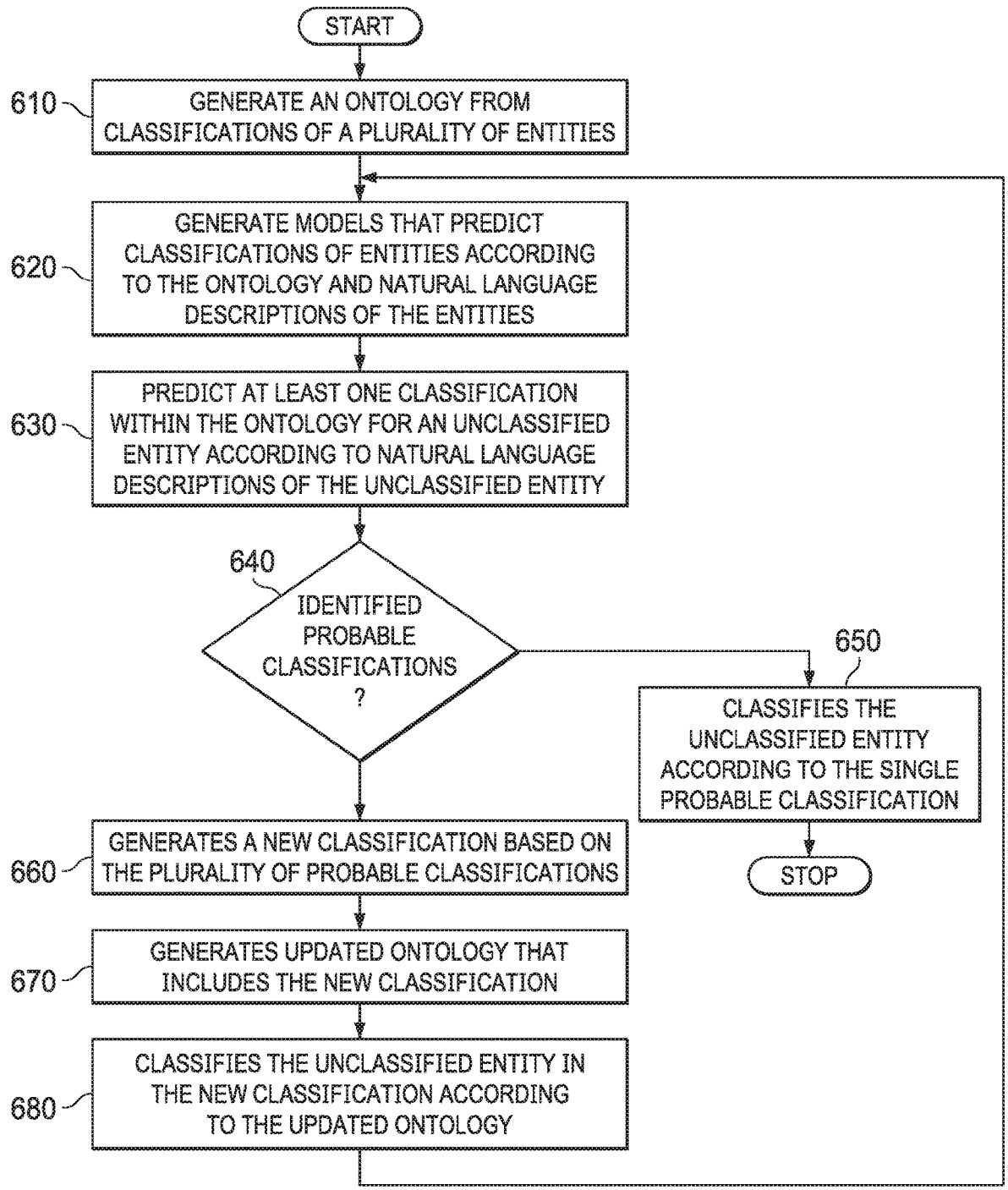
FIG. 6 is a flowchart of a process for dynamically managing an ontology for classifying entities in accordance with an illustrative embodiment.

Turning next to FIG. 6, a flowchart of a process for training an artificial intelligence model is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in ontology manager 136 in computer system 206 in FIG. 2.

The process begins by generating an ontology from classifications of a plurality of entities (step 610). In step 610, the classifications can be industrial groupings of the companies based on similar production processes, similar products, similar behavior in financial markets, or combinations thereof. the classifications can be selected from classifications within a North American Industry Classification System, a Global Industry Classification Standard, and a Standard Industrial Classification.

The process generates models that predict classifications of entities according to the ontology and natural language descriptions of the entities (step 620). In step 620, the models can be one or more artificial intelligence models, including one or more natural language models. The natural language model can be generated from the natural language descriptions of the entities using a bidirectional language architecture, such as Bidirectional Encoder Representations from Transformers (BERT). In one illustrative example, in step 620, the process can generate a first model to predict a core capability of the companies and a second model to predict a target market of the companies.

The process predicts at least one classification within the ontology for an unclassified entity according to natural language descriptions of the unclassified entity (step 630). In response to identifying a single probable classification within the ontology ("single" at step 640), the process classifies the unclassified entity according to the single probable classification (step 650). The process terminates thereafter.

Returning to step 640, In responsive to identifying a plurality of probable classifications within the ontology ("plurality" at step 640), the process generates a new classification based on the plurality of probable classifications (step 660). The process generates updated ontology that includes the new classification (step 670). The process classifies the unclassified entity in the new classification according to the updated ontology (step 680). Thereafter, the process can iterate back to step 620, generating new models according to the updated ontology.

It should be noted that the steps shown in FIG. 6 need not occur in the order shown. For example, steps 660, 670, and 680 might occur in reverse order or concurrently.

Figure 7:
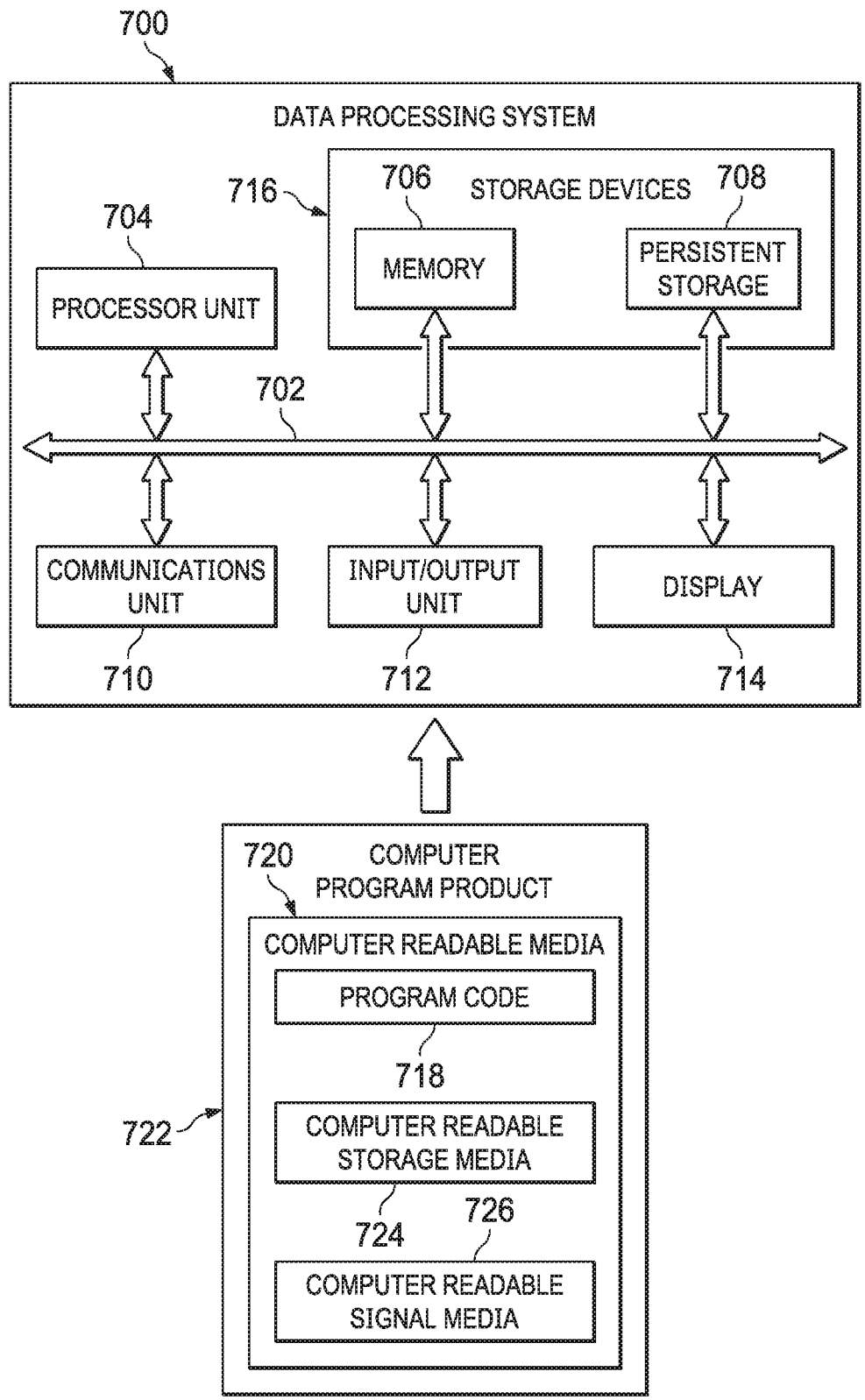
FIG. 7 is a block diagram of a data processing system in accordance with an illustrative embodiment.

Turning now to FIG. 7, a block diagram of a data processing system is depicted in accordance with an illustrative embodiment. Data processing system 700 can be used to implement server computer 104, server computer 106, client devices 110, in FIG. 1. Data processing system 600 can also be used to implement computer system 206 in FIG. 2. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device. Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program code, computer usable program code, or computer-readable program code that can be read and executed by a processor in processor unit 704. The program code in the different embodiments can be embodied on different physical or computer-readable storage media, such as memory 706 or persistent storage 708.

Program code 718 is located in a functional form on computer-readable media 720 that is selectively removable and can be loaded onto or transferred to data processing system 700 for execution by processor unit 704. Program code 718 and computer-readable media 720 form computer program product 722 in these illustrative examples. In the illustrative example, computer-readable media 720 is computer-readable storage media 724.

In these illustrative examples, computer-readable storage media 724 is a physical or tangible storage device used to store program code 718 rather than a medium that propagates or transmits program code 718.

Alternatively, program code 718 can be transferred to data processing system 700 using a computer-readable signal media. The computer-readable signal media can be, for example, a propagated data signal containing program code 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 718 can be located in computer-readable media 720 in the form of a single storage device or system. In another example, program code 718 can be located in computer-readable media 720 that is distributed in multiple data processing systems. In other words, some instructions in program code 718 can be located in one data processing system while other instructions in program code 718 can be located in one data processing system. For example, a portion of program code 718 can be located in computer-readable media 720 in a server computer while another portion of program code 718 can be located in computer-readable media 720 located in a set of client computers.

The different components illustrated for data processing system 700 are not meant to provide architectural limitations to the manner in which different embodiments can be implemented. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program code 718.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, memory 706, or portions thereof, may be incorporated in processor unit 704 in some illustrative examples.

Thus, illustrative embodiments by method, apparatus, system, and computer program product for dynamically managing an ontology for classifying entities. In one illustrative example, an automated process generates an ontology from the classifications of a plurality of entities. Models are generated that predict classifications according to the ontology and natural language descriptions of the entities. Unclassified entities are modeled according to the models to identify at least one classification within the ontology. Responsive to identifying a plurality of probable classifications within the ontology, a new classification is generated based on the plurality of probable classifications, an updated ontology is generated that includes the new classification, and the unclassified entity is classified according to the new classification. This automated process can be implemented in the illustrative example described for FIG. 2 in which ontology manager 136 operates to train artificial intelligence models 130.

Thus, in the illustrative examples, an ontology can be generated and managed more quickly using greater number of training documents by the automated processes in ontology manager 202 in FIG. 2, as compared to the number of training documents generated by human operators. For example, the generation of hundreds of thousands of training documents and training of an artificial intelligence model using the training documents can be performed in seconds or minutes in the illustrative examples rather than hours or days using current techniques in which only hundreds of training documents are generated and used for training.

Further, in the illustrative example, the accuracy of artificial intelligence models can be improved when using ontology manager 202 to generate training documents and train the artificial intelligence models. This increased accuracy in artificial intelligence models 130 can occur through the ability to use larger numbers of training documents generated by ontology manager 202 as compared to the number of training documents used by current techniques.

Additionally, ontology manager 202 can use semi-supervised machine learning to train artificial intelligence model 130 more quickly and accurately as compared to current techniques that use supervised or unsupervised machine learning. With the use of semi-supervised machine learning, increased accuracy and performance can be achieved when training artificial intelligence models.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A data classification system comprising:
a computer system; and
an ontology manager in the computer system, wherein the ontology manager is configured:
to generate an ontology from classifications of a plurality of entities;
to generate a number of machine learning models that predict classifications of entities according to the ontology and natural language descriptions of the entities;
to predict at least one classification within the ontology for an unclassified entity according to natural language descriptions of the unclassified entity; and
responsive to identifying a plurality of probable classifications within the ontology:
to generate a new classification based on the plurality of probable classifications using the number of machine learning model;
to generate an updated ontology that includes the new classification using the number of machine learning model;
to classify the unclassified entity in the new classification according to the updated ontology, wherein the classification for each unclassified entity generates a probability distribution indicating likelihood of each unclassified entity belongs to each classification from the plurality of probable classifications; and
to train the number of machine learning models based on the updated ontology and the natural language descriptions of the plurality of entities to generate a number of updated machine learning models for classifying the plurality of entities.

2. The data classification system of claim 1, wherein the ontology manager is further configured:
responsive to identifying a single probable classification within the ontology, to classify the unclassified entity according to the single probable classification.

3. The data classification system of claim 1, wherein in generating the number of machine learning models, the ontology manager is further configured:
to generate a deep Bidirectional Encoder Representations from Transformers (BERT) language model from the natural language descriptions of the entities.

4. The data classification system of claim 1, wherein:
the plurality of entities is a plurality of companies; and
the classifications organize the companies into industrial groupings based on similar production processes, similar products, or similar behavior in financial markets.

5. The data classification system of claim 4, wherein in generating the number of machine learning models, the ontology manager is further configured:
to generate a first model to predict a core capability of the companies; and
to generate a second model to predict a target market of the companies.

6. The data classification system of claim 4, wherein:
the classifications are industrial groupings of the companies based on similar production processes, similar products, similar behavior in financial markets, or combinations thereof.

7. The data classification system of claim 6, wherein the classifications are selected from classifications within a North American Industry Classification System, a Global Industry Classification Standard, and a Standard Industrial Classification.

8. The data classification system of claim 1, wherein input to the number of machine learning model is a combination of three embeddings comprising positional embeddings to express position of words in a sentence, segment embedding that distinguish between sentence pairs, and token embedding for specific token from pretraining corpus token vocabulary.

9. A computer-implemented method for dynamically managing an ontology for classifying entities, comprising:
generating the ontology from classifications of a plurality of entities;
generating a number of machine learning models that predict classifications according to the ontology and natural language descriptions of the entities;
predicting at least one classification within the ontology for an unclassified entity according to natural language descriptions of the unclassified entity; and
responsive to identifying a plurality of probable classifications within the ontology, generating a new classification based on the plurality of probable classifications using the number of machine learning model, generating an updated ontology that includes the new classification using the number of machine learning model, classifying the unclassified entity in the new classification according to the updated ontology, wherein the classification for each unclassified entity generates a probability distribution indicating likelihood of each unclassified entity belongs to each classification from the plurality of probable classifications, and training the number of machine learning models based on the updated ontology and the natural language descriptions of the plurality of entities to generate a number of updated machine learning models for classifying the plurality of entities.

10. The computer-implemented method of claim 9, further comprising:
responsive to identifying a single probable classification within the ontology, classifying the unclassified entity according to the single probable classification.

11. The computer-implemented method of claim 9, wherein generating the number of machine learning models further comprises:
generating a deep Bidirectional Encoder Representations from Transformers (BERT) language model from the natural language descriptions of the entities.

12. The computer-implemented method of claim 9, wherein:
the plurality of entities is a plurality of companies; and
the classifications organize the companies into industrial groupings based on similar production processes, similar products, or similar behavior in financial markets.

13. The computer-implemented method of claim 12, wherein generating the number of machine learning models further comprises:
generating a first model to predict a core capability of the companies; and
generating a second model to predict a target market of the companies.

14. The computer-implemented method of claim 12, wherein:
the classifications are industrial groupings of the companies based on similar production processes, similar products, similar behavior in financial markets, or combinations thereof.

15. The computer-implemented method of claim 14, wherein the classifications are selected from classifications within a North American Industry Classification System, a Global Industry Classification Standard, and a Standard Industrial Classification.

16. The computer-implemented method of claim 12, wherein input to the number of machine learning model is a combination of three embeddings comprising positional embeddings to express position of words in a sentence, segment embedding that distinguish between sentence pairs, and token embedding for specific token from pretraining corpus token vocabulary.

17. A computer program product for dynamically managing an ontology for classifying entities, the computer program product comprising:
a computer-readable storage media;
program code, stored on the computer-readable storage media, executable by a computer system to cause the computer system to generate the ontology from classifications of a plurality of entities;
program code, stored on the computer-readable storage media, executable by the computer system to cause the computer system to generate a number of machine learning models that predict classifications according to the ontology and natural language descriptions of the entities;

program code, stored on the computer-readable storage media, executable by the computer system to cause the computer system to predict at least one classification within the ontology for an unclassified entity according to natural language descriptions of the unclassified entity; and
program code, stored on the computer-readable storage media, executable by the computer system in response to identifying a plurality of probable classifications within the ontology, to cause the computer system to generate a new classification based on the plurality of probable classifications using the number of machine learning models, to generate an updated ontology that includes the new classification using the number of machine learning model, to classify the unclassified entity in the new classification according to the updated ontology, wherein the classification for each unclassified entity generates a probability distribution indicating likelihood of each unclassified entity belongs to each classification from the plurality of probable classifications, and to train the number of machine learning models based on the updated ontology and the natural language descriptions of the plurality of entities to generate a number of updated machine learning models for classifying the plurality of entities.

18. The computer program product of claim 17, further comprising:
program code, stored on the computer-readable storage media, executable by the computer system in response to identifying a single probable classification within the ontology to cause the computer system to classify the unclassified entity according to the single probable classification.

19. The computer program product of claim 17, wherein program code for generating the number of machine learning models further comprises:
program code for generating a deep Bidirectional Encoder Representations from Transformers (BERT) language model from the natural language descriptions of the entities.

20. The computer program product of claim 17, wherein:
the plurality of entities is a plurality of companies; and
the classifications organize the companies into industrial groupings based on similar production processes, similar products, or similar behavior in financial markets.

21. The computer program product of claim 20, wherein the program code for generating the number of machine learning models further comprises:
program code for generating a first model to predict a core capability of the companies; and
program code for generating a second model to predict a target market of the companies.

22. The computer program product of claim 20, wherein:
the classifications are industrial groupings of the companies based on similar production processes, similar products, similar behavior in financial markets, or combinations thereof.

23. The computer program product of claim 22, wherein the classifications are selected from classifications within a North American Industry Classification System, a Global Industry Classification Standard, and a Standard Industrial Classification.

24. The computer program product of claim 17, wherein input to the number of machine learning model is a combination of three embeddings comprising positional embeddings to express position of words in a sentence, segment embedding that distinguish between sentence pairs, and token embedding for specific token from pretraining corpus token vocabulary.

* * * * *